United States Patent [19]

Huliba et al.

[11] 4,268,836

[45] May 19, 1981

[54] INK JET PRINTER HAVING IMPROVED CATCHER

[75] Inventors: David A. Huliba; Lonnie P. Robinson, both of Dayton, Ohio

[73] Assignee: The Mead Corporation, Dayton, Ohio

[21] Appl. No.: 88,328

[22] Filed: Oct. 25, 1979

[51] Int. Cl.[3] .......... G01D 15/18

[52] U.S. Cl. .......... 346/75

[58] Field of Search .......... 346/75, 140 R

[56] References Cited

U.S. PATENT DOCUMENTS

| | | | |
|---|---|---|---|
| 3,373,437 | 3/1968 | Sweet | 346/75 |
| 3,606,973 | 9/1971 | Davis | 346/75 X |
| 3,611,422 | 10/1971 | Rourke | 346/75 |
| 3,701,998 | 10/1972 | Matais | 346/75 |
| 3,777,307 | 12/1973 | Duffield | 346/75 |
| 3,813,675 | 5/1974 | Steffy | 346/75 |
| 3,836,914 | 9/1974 | Duffield | 346/75 |
| 3,936,135 | 2/1976 | Duffield | 346/75 X |
| 4,010,477 | 3/1977 | Frey | 346/75 |
| 4,035,811 | 7/1977 | Paranjpe | 346/75 |
| 4,084,164 | 4/1978 | Alt | 346/75 |

OTHER PUBLICATIONS

Hungarter et al., Ink Jet Gutter, IBM Tech. Disc. Bulletin, vol. 19, No. 6, Nov. 1976, pp. 2038–2039.

*Primary Examiner*—Joseph W. Hartary

*Attorney, Agent, or Firm*—Biebel, French & Nauman

[57] ABSTRACT

An ink jet printer for depositing ink drops from a plurality of jet drop streams on a print receiving medium includes a print head which generates a plurality of jet drop streams, such streams being positioned in at least one row. The drops are selectively charged and, thereafter, pass adjacent a deflection electrode which extends parallel to and to one side of the row of jet drop streams. A drop deflecting electrical potential is applied to the deflection electrode to produce a drop deflection field which directs the drops into print and catch trajectories. A catcher extends parallel to the row of jet drop streams and on the opposite side of the row from the deflection electrode. The catcher is positioned directly opposite the deflection electrode and receives drops in the catch trajectories, while permitting the drops in the print trajectories to strike the print receiving medium. The catcher includes a plurality of internal catcher cavities and defines a substantially vertical drop catching surface and a drop ingesting slot beneath the drop catching surface. Each of the cavities communicates with an associated portion of the drop ingesting slot. The catcher may include a substantially electrically non-conductive body portion which defines the drop catching surface.

24 Claims, 4 Drawing Figures

INK JET PRINTER HAVING IMPROVED CATCHER

BACKGROUND OF THE INVENTION

The present invention relates to an ink jet printer generally of the type disclosed in U.S. Pat. No. 3,701,998, issued Oct. 31, 1972, to Mathis. The Mathis printer includes a print head having an orifice plate defining two rows of orifices. Two rows of jet drop streams are generated from the single print head. The drop streams pass through two corresponding rows of charge rings. The rows of jet drop streams then pass on opposite sides of an electrically conductive deflection electrode which provides a static electrical deflection field for deflecting selectively drops outward from the electrode.

A pair of electrically conductive catchers are positioned outwardly of the rows of jet drop streams, each of the catchers being positioned directly opposite the deflection electrode. The catchers are formed of electrically conductive material and are electrically grounded such that a substantial electrical field is provided between the deflection electrode and each of the catchers. Charged drops from the jet drop streams are deflected outward such that they strike the catchers. Each catcher includes a vertical drop catching surface which is struck by the deflected drops. The drops then run down this surface and are ingested into a single catcher cavity, defined within the body of the catcher, via a drop ingesting slot which extends along the catcher beneath the drop catching surface.

A number of different catcher designs have been utilized in ink jet printers. U.S. Pat. No. 3,611,422, issued Oct. 5, 1971, to Rourke discloses a metal catcher which is positioned below a pair of deflection electrodes. Since deflection of selectively charged drops is accomplished by the field provided between the pair of electrodes, the catcher of Rourke need not be grounded.

U.S. Pat. No. 3,936,135 issued Feb. 3, 1976, to Duffield discloses a drop catcher structure which is mounted beneath a pair of deflection electrodes. This catcher need not be electrically grounded since it is not utilized to produce the drop deflection field. Another catcher structure is disclosed in IBM Technical Disclosure Bulletin, Vol. 19, No. 6, November 1976, "Ink Jet Gutter", Hungarter et al. The disclosed catcher structure is formed of multiple laminations of non-conductive material. The gutter is positioned beneath the portion of the printer which provides aiming of the jet drop streams.

Several other catcher designs have been utilized in printers of the type in which the catcher is positioned directly opposite the deflection electrode. One such catcher is shown in U.S. Pat. No. 3,777,307, issued Dec. 4, 1973, to Duffield and U.S. Pat. No. 3,836,914, issued Sept. 17, 1974, to Duffield. This catcher has a porous metal insert positioned along its upper surface, covering an elongated, partially evacuated cavity. It further includes a convex catching face having a lower radius of about 0.114 cm and extending rearwardly into a drop ingesting slot. The catcher defines a single internal catcher cavity into which the ink is drawn by a partial vacuum supplied to the cavity through a pair of vacuum tubes.

U.S. Pat. No. 3,813,675, issued May 28, 1974, to Steffy et al discloses a catcher having a series of facial channels for carrying away the ink deposited on the drop catching surface. The channels are aligned with the jets such that each jet has its own channel for guiding ink into a single internal catcher cavity.

U.S. Pat. No. 4,035,811, issued July 12, 1977, to Paranjpe, discloses a catcher having a substantially vertical drop catching surface and an upwardly extending drop ingesting opening defined in part by a curved surface at the bottom of the drop catching surface. Drops which strike the drop catching surface flow downward and, thereafter, upward through the opening. A bottom plate, extending along the bottom of the catcher and defining the drop ingesting opening with the curved surface, is formed from a porous material.

Various difficulties have been encountered with prior art catchers. Printers utilizing a catcher which is positioned beneath a separate drop deflecting electrode structure are disadvantageous in that the path traveled by each drop is substantially greater than is the case in a Mathis type printer. It will be appreciated that an increase in the path of the jet drops amplifies the effect of errors in the drop trajectories.

Prior art catchers used in Mathis type printers, in which the catchers are positioned directly opposite a deflection electrode, have also presented problems in operation. Such catchers have typically been formed of an electrically conductive material. As a result, ink build-up on the upper surfaces of such a catcher has, on occasion, resulted in shorting between the charge electrodes and the grounded catcher. Also, the single cavity defined within such a catcher has produced turbulent air and ink flow and uneven ingestion of ink through the drop ingesting slot. If sufficient ink builds up on the drop catching surface in the region of the slot, this ink may interfere with the trajectories of the drops which are intended to pass adjacent the catcher and strike the print receiving medium. Further, the height of the slot has been somewhat difficult to control precisely, since this slot is defined by a curved drop catching surface in conjunction with a lower plate.

Where multiple vacuum tubes have been connected to the catcher cavity from a vacuum manifold, variation in the suction provided from these tubes has also resulted in an uneven drop ingestion along the length of the slot. Finally, construction of catchers from a conductive material has been relatively difficult and expensive.

Accordingly, it is seen that there is a need for a simple, easily fabricated catcher structure, which avoids the disadvantages of prior art catchers.

SUMMARY OF THE INVENTION

An ink jet printer for depositing ink drops from a plurality of jet drop streams on a print receiving medium includes print head means which generates the jet drop streams with the streams positioned in a row. A means is provided for selectively charging drops in the plurality of jet drop streams. A deflection electrode means extends parallel to and to one side of the row of jet drop streams, with the deflection electrode means being positioned between means for selectively charging drops and the print receiving medium. A means is provided for applying a drop deflecting electrical potential to the deflection electrode means to produce a deflection field through which the jet drop streams pass. The drop deflection field directs the drops into print and catch trajectories. A substantially electrically non-conductive catcher means extends parallel to the row of jet drop streams on the opposite side of the row from the deflection electrode means. The catcher means is positioned directly opposite the deflection electrode means. The catcher means receives drops in the catch trajectories, while permitting drops in the print trajectories to strike the print receiving medium.

The catcher means may define a drop catching surface extending parallel to the row of jet drop streams and a drop ingesting slot, beneath the drop catching surface. Drops striking the drop catching surface run down the surface and are ingested into the slot. The catcher means may further define a plurality of separate internal cavities, each such cavity communicating with an associated portion of the slot. A vacuum source means may be connected to each of a plurality of vacuum lines. Each vacuum line is connected to an associated one of the internal cavities.

The catcher means may comprise a substantially non-conductive upper body portion defining the drop catching surface. The upper body portion may further define a plurality of recesses in the bottom surface of the upper body portion, with the recesses being positioned in a row parallel to the drop catching surface and separated by partitions integrally formed with the upper body portion. The catcher means may further comprise a porous lower plate mounted on the lower surface of the upper body portion and defining the slot and the internal cavities therewith. The lower portions of the partitions define downwardly extending lands, with the porous lower plate being mounted on the lands, such that the height of the slot is precisely defined. The porous lower plate may be adhesively bonded to the lands.

The vacuum source means may include a vacuum manifold having a source of partial vacuum connected to opposite ends thereof. The plurality of vacuum lines are connected to the vacuum manifold intermediate the opposite ends. The vacuum lines connected to the manifold adjacent the ends have substantially smaller interior diameters than lines connected to the manifold therebetween.

Accordingly, it is an object of the present invention to provide an ink jet printer and a catcher therefor in which the catcher is formed of a material which is substantially electrically non-conductive; to provide such a printer and catcher therefor in which the catcher defines a drop catching surface and a drop ingesting slot below the surface; to provide such a printer and catcher therefor in which a plurality of internal cavities within the catcher communicate with associated portions of the slot; and to provide such a catcher in which ink drops deposited upon the drop catching surface are effectively ingested.

DETAILED DESCRIPTION OF THE PREFERRED EMBODIMENT

Figure 1:
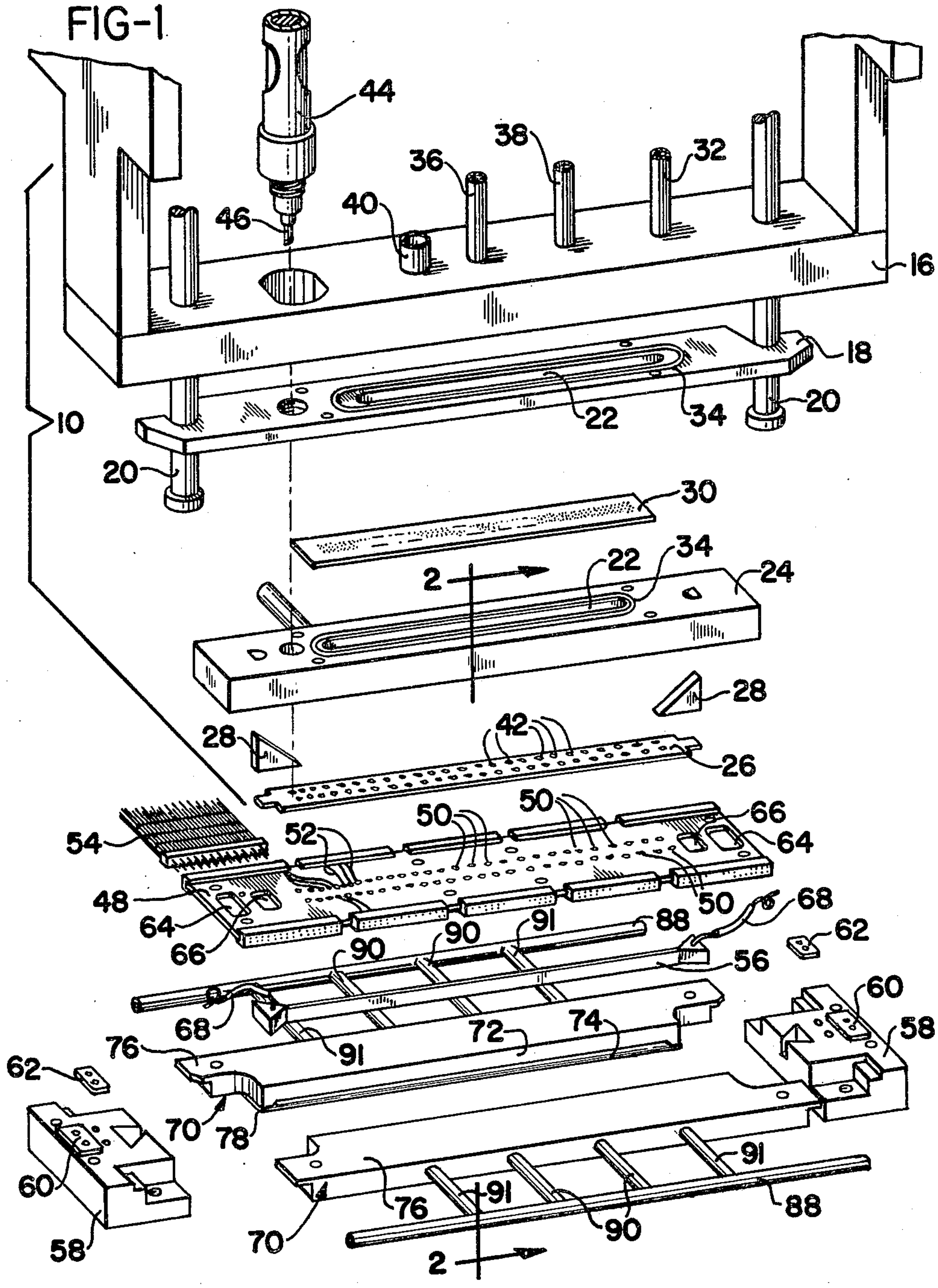
FIG. 1 is an exploded perspective view of the ink jet printer of the present invention.
Figure 2:
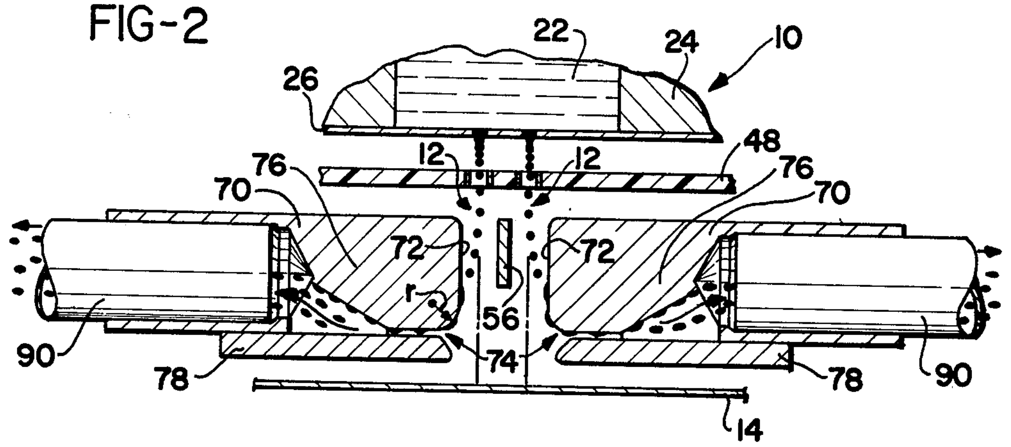
FIG. 2 is a partial enlarged sectional view of the printer, taken generally along lines 2—2 in FIG. 1.

Reference is made to FIGS. 1 and 2 which show an ink jet printer constructed according to the present invention. The printer illustrated utilizes a jet drop stream generation and charging arrangement similar to that disclosed in U.S. Pat. No. 3,701,998, issued Oct. 31, 1972, to Mathis, and reference may therefore be made to the Mathis patent for additional detail. It will be appreciated, however, that the present invention is not limited to any specific drop generation and charging technique and, therefore, any one of a number of prior art techniques may be utilized.

As discussed more fully in Mathis, the ink jet printer includes a print head means 10 for generating a plurality of jet drop streams 12 (FIG. 2) directed at a print receiving medium 14. The jet drop streams are positioned in at least one row, although a two row printer is shown for purposes of explanation. The print head means 10 includes a support bar 16 which supports the printer components. A clamp bar 18, connected to the support bar 16 by means of clamp rods 20, defines a fluid reservoir 22 in conjunction with a fluid supply manifold 24 and an orifice plate 26. Orifice plate 26 is bonded to fluid supply manifold 24 with a pair of wedge shaped acoustical dampers 28 therebetween.

A filter plate 30 is positioned to extend across the reservoir 22 and provide filtering of fluid supplied to reservoir 22 by fluid supply tube 32. O-ring gaskets 34 insure that the reservoir 22 is fluid tight. Air inlet and supply tubes 36 and 38 communicate with the reservoir 22, as does a pressure transducer connection tube 40. Fluid supplied to the reservoir 22 under pressure emerges from the orifices 42 in orifice plate 26 as fluid filaments which break up into a pair of rows of jet drop streams.

In order to produce drops of substantially uniform size and spacing, transducer 44 is mounted in support bar 16 and has a stimulation probe 46 which extends through the manifold 24 and contacts the orifice plate 26. Transducer 44 may be a piezoelectric transducer which produces bending waves which travel along the orifice plate 26 and stimulate the jet drop streams for uniform breakup.

Charge ring plate 48 provides a means for selectively charging drops in the plurality of jet drop streams. Drops are typically charged binarily, with the drops which are to be deposited on the print receiving medium 14 being uncharged and the drops which are not to be deposited on the print receiving medium 14 being charged to a predetermined electrical charge potential. Each of the jet drop streams passes downward through an associated opening 50 in the charge ring plate 48. Each such opening is lined with an electrically conductive material which forms a charge electrode or ring. Electrical signals are applied to the charge electrodes selectively by conductors 52 which may be printed on the surface of plate 48. Conductors 52 are in turn connected via connectors 54, only one of which is illustrated, to an appropriate charge potential source, such as a computer or a photo-optical scanner. Charges are induced in each of the selected drops by placing an electrical potential on the appropriate charge ring at the instant of drop formation.

The jet drop streams then pass downward adjacent a deflection electrode means which may comprise a thin, electrically conductive ribbon 56. The deflection electrode means extends between the rows of jet drop streams and parallel thereto. As shown in FIG. 2, the deflection electrode means is positioned between the means for selectively charging drops and the print receiving medium 14. Ribbon 56 is supported by holders 58 which are fastened directly to the fluid supply manifold 24. Spacers 60 and 62 reach through apertures 64 and 66, respectively, in charge ring plate 48 to support holders 58. The deflection electrode 56 is stretched tightly between the holders 58 and has a drop deflecting electrical potential applied thereto by conductors 68. The drop deflecting electrical potential produces a deflection field through which the jet drop streams pass, with the drops being directed into print and catch trajectories.

A pair of drop catchers 70 extend parallel to the rows of jet drop streams and are positioned outwardly from the deflection electrode 56 on opposite sides of the rows. The catchers 70 receive drops in the catch trajectories, as shown in FIG. 2, while permitting drops in the print trajectories to strike the print receiving medium 14. The catchers 70 are positioned directly opposite the deflection electrode 56.

As seen in FIG. 1, catchers 70 are mounted on holders 58. Each catcher 70 defines a drop catching surface 72 which extends parallel to the adjacent row of jet drop streams. Each catcher further defines a drop ingesting slot 74, beneath the drop catching surface 72. Drops which strike the drop catching surface 72 run down the surface and are ingested into slot 74 as shown in FIG. 2.

Figure 3:
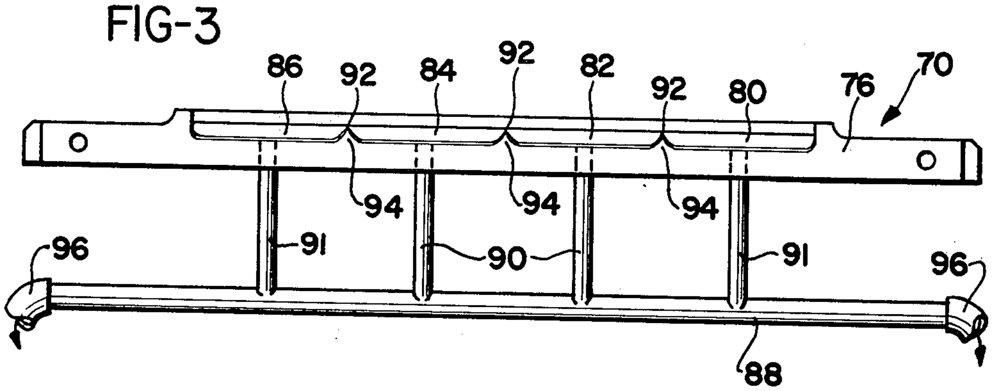
FIG. 3 is a view of a catcher according to the present invention with the porous lower plate removed.

Each catcher 70 comprises an upper body portion 76 and a porous lower plate 78. FIG. 3, a view of a catcher 70 with plate 78 removed, shows a plurality of separate internal cavities 80, 82, 84, and 86. Each of the cavities 80–86 communicates with an associated portion of slot 74. A vacuum source means, including vacuum manifold 88 is connected to each of the separate internal cavities 80–86 by means of a plurality of vacuum lines 90 and 91. By providing a plurality of internal cavities within the catcher, with each of the cavities communicating with only a portion of the slot 74, and each such cavity having its own source of vacuum, fluid ingestion into the catcher is enhanced. The air and fluid turbulence found in catchers having only a single large internal cavity is substantially reduced. Additionally, this arrangement provides a means by which the vacuum within the catcher adjacent the slot may be precisely controlled along the entire length of slot 74 to insure that uniform drop ingestion is obtained.

Although the advantages obtained by providing a plurality of internal cavities within the catcher 70 may be realized utilizing a catcher having an electrically conductive upper body portion 76, it has been found desirable to form the upper body portion 76 of a non-conductive material. Catchers have been built and successfully tested in which the upper body portion is formed of a fiberglass reinforced epoxy, such as Stycast 2058, marketed by Emerson & Cumming, Inc., Canton, MA.

Such a non-conductive upper body portion has several advantages. Electrically conductive ink accidentally collecting on the top of prior art grounded metal catchers has the potential for shorting the charge electrodes to ground. By forming the upper body portion 76 of non-conductive material, this shorting is prevented. Additionally, frequent polishing of the drop catching surface of metal catchers is required for successful operation, since the downward flow of the drops striking the surface 72 is dependent upon the surface being relatively smooth. Such a drop catching surface defined by an upper body portion made of epoxy, however, does not roughen during use and therefore the required smooth surface is maintained with greatly reduced maintenance. Finally, an upper body portion for a catcher may be molded from fiberglass reinforced epoxy at a substantially reduced cost, as compared with manufacturing costs for prior art metal catchers.

Although the mechanism by which a non-conductive catcher face contributes to the generation of an electrical potential gradient is not completely understood, several theories explaining the mechanism by which the catcher operates have been advanced. One such theory suggests that the conductive ink flowing down the face of the catcher provides a ground plane for production of the potential gradient. Another view is that while the catcher is basically non-conductive, it may have sufficient conductivity over an extended period of operation to operate as a ground plane, since the catcher is in contact with other printer components which are grounded.

Figure 4:
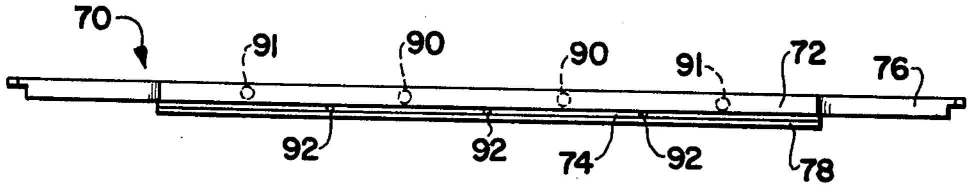
FIG. 4 is a front view of the catcher, showing the drop catching surface and drop ingesting slot therebeneath.

As seen in FIGS. 3 and 4, the recesses 80–86 are positioned in a row parallel to the drop catching surface 72 and are separated by partitions 92 which are integrally formed with the upper body portion 70. Lower plate 78, which may be formed of a porous material such as sintered steel, is mounted on the lower surface of the upper body portion 76 and defines the slot 74 and the internal cavities 80–86 therewith. The lower portions of partitions 92 define downward extending lands 94 upon which the porous lower plate 78 is mounted. With such an arrangement, the height of the slot 74 is precisely defined. The porous lower plate may advantageously be adhesively bonded to the lands 94.

Vacuum manifold 88 is connected to hoses 96 which provide a source of partial vacuum to opposite ends of the manifold 88. The vacuum lines 90 and 91 are connected to the vacuum manifold 88 intermediate the points at which hoses 96 are connected to the manifold 88. The vacuum lines 91 connected to the manifold 88 adjacent the ends thereof have substantially smaller interior diameters than the vacuum lines 90 connected to the manifold 88 therebetween. By utilizing vacuum lines of differing internal diameter, it is possible to equalize the suction applied to each of the internal cavities 80–86, even though the outer lines 91 are connected to the manifolds 88 at points closer to the hoses 96 than the vacuum lines 90. It has been found that utilizing outer vacuum lines having an internal diameter of approximately 0.12 inches with the inner two lines having an internal diameter of approximately 0.18 inches produces a more even distribution of suction to the cavities 80–86.

It has also been found that providing a drop catching surface 72 having an inward curved portion which curves into the drop ingesting slot 74 with the radius of curvature r (FIG. 2) being substantially greater than that utilized in prior art catchers increases the drop ingesting effectiveness of the catcher. A radius of curvature of approximately $\frac{1}{8}$ inch is preferred. By providing an inward curve to the drop catching surface 72, even if ink accumulates on this surface in the region adjacent the slot 74, the accumulated ink will not project outward from the surface 72 sufficiently to interfere with the trajectories of the uncharged drops and operation of the catcher will therefore be enhanced.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet printer for depositing ink drops from a plurality of jet drop streams on a printing receiving medium, comprising print head means for generating a plurality of jet drop streams directed at said print receiving medium, said jet drop streams positioned in a row, means for selectively charging drops in said plurality of jet drop streams, deflection electrode means extending parallel to and to one side of said row of jet drop streams, said deflection electrode means positioned between said means for selectiely charging drops and said print receiving medium, means for applying a drop deflecting electrical potential to said deflection electrode means to produce a drop deflection field through which said jet drop streams pass, said drop deflection field directing said drops into print and catch trajectories, and catcher means, extending parallel to said row of jet drop streams and on the opposite side of said row from said deflection electrode means, said catcher means positioned directly opposite said deflection electrode means, for receiving drops in said catch trajectories, while permitting drops in said print trajectories to strike said print receiving medium, said catcher means defining a drop ingesting slot and a plurality of separate internal cavities, each such cavity communicating with an associated portion of said slot.

2. The ink jet printer of claim 1 in which said catcher means is formed of a fiberglass reinforced epoxy material.

3. The ink jet printer of claim 1 in which said catcher means defines a drop catching surface extending parallel to said row of jet drop streams above said drop ingesting slot, whereby drops striking said drop catching surface run down said surface and are ingested into said slot.

4. The ink jet printer of claim 3 in which said catcher means comprises:

a substantially non-conductive upper body portion defining said drop catching surface and further defining a plurality of recesses in the bottom surface of said upper body portion, said recesses positioned in a row parallel to said drop catching surface, and separated by partitions integrally formed with said upper body portion, and a porous lower plate mounted on the lower surface of said upper body portion and defining said slot and said internal cavities therewith.

5. The ink jet printer of claim 4 in which the lower portions of said partitions define downward extending lands and in which said porous lower plate is mounted on said lands, whereby the height of said slot is precisely defined.

6. The ink jet printer of claim 5 in which said porous lower plate is adhesively bonded to said lands.

7. The ink jet printer of claim 1 further comprising vacuum source means, and a plurality of vacuum lines, each of said lines connecting said vacuum source means to an associated one of said internal cavities.

8. The ink jet printer of claim 7 in which said vacuum source means includes a vacuum manifold having a source of partial vacuum connected to opposite ends thereof, said plurality of vacuum lines connected to said vacuum manifold intermediate said opposite ends, and in which said vacuum lines connected to said manifold, adjacent said ends have substantially smaller interior diameters than lines connected to said manifold therebetween.

9. An ink jet printer for depositing ink drops from a plurality of jet drop streams on a print receiving medium, comprising print head means for generating a plurality of jet drop streams directed at said print receiving medium, said jet drop streams positioned in a pair of parallel rows, means for selectively charging drops in said plurality of jet drop streams, deflection electrode means extending between said rows of jet drop streams and parallel thereto, said deflection electrode means positioned between said means for selectively charging drops and said print receiving medium, means for applying a drop deflecting electrical potential to said deflection electrode means to produce a deflection field through which said jet drop streams pass, said drop deflection field directing said drops into print and catch trajectories, and a pair of drop catchers, extending parallel to said rows of jet drop streams and positioned outwardly from said deflection electrode means on opposite sides of said rows, for receiving drops in said catch trajectories while permitting drops in said print trajectories to strike said print receiving medium, each of said drop catchers defining a drop ingesting slot and a plurality of separate internal cavities, each such cavity communicating with an associated portion of said slot.

10. The ink jet printer of claim 9 in which said molded plastic catchers are formed of a fiberglass reinforced epoxy material.

11. The ink jet printer of claim 9 in which each of said catchers defines a drop catching surface, extending parallel to the adjacent row of jet drop streams above said drop ingesting slot, whereby drops striking said drop catching surface run down said surface and are ingested into said slot.

12. The ink jet printer of claim 11 in which each of said catchers comprises:

a substantial non-conductive upper body portion defining said drop catching surface and further defining a plurality of recesses in the bottom surface of said upper body portion, said recesses positioned in a row parallel to said drop catching surface and separated by partitions integrally formed with said upper body portion, and a porous lower plate mounted on the lower surface of said upper body portion and defining said slot and said internal cavities therewith.

13. The ink jet printer of claim 12 in which the lower portions of said partitions define downward extending lands and in which said porous lower plate is mounted on said lands, whereby the height of said slot is precisely defined.

14. The ink jet printer of claim 13 in which said porous lower plate is adhesively bonded to said lands.

15. The ink jet printer of claim 9 further comprising vacuum source means, and a plurality of vacuum lines, each of said lines connecting said vacuum source means to an associated one of said internal cavities.

16. The ink jet printer of claim 15 in which said vacuum source means includes a pair of vacuum manifolds, each of said vacuum manifolds associated with a respective one of said catchers, and a source of partial vacuum connected to opposite ends of each of said vacuum manifolds.

17. The ink jet printer of claim 16 in which vacuum lines from each of said catchers are connected to the vacuum manifold associated therewith intermediate said opposite ends, and in which said vacuum lines connected to each manifold adjacent the ends thereof have substantially smaller interior diameters than vacuum lines connected to said manifolds therebetween.

18. A catcher for use in an ink jet printer in which selected ones of the drops in a plurality of jet drop streams are directed to said catcher and are caught, thereby preventing deposit of said drops on a print receiving medium, comprising:

an upper body portion defining a substantially vertical drop catching surface, a lower plate portion, beneath said upper body portion and defining therewith a drop ingesting slot beneath said drop catching surface, said lower plate portion and said upper body portion further defining therebetween a plurality of internal catcher cavities, each cavity communicating with an associated portion of said drop ingesting slot, and a plurality of vacuum lines, each of said vacuum lines communicating with an associated one of said internal catcher cavities, whereby drops striking said drop catching surface run down said surface and are ingested through said slot into said cavities and are thereafter removed by said vacuum lines from said cavities.

19. The catcher of claim 18 in which said upper body portion defines a plurality of recesses in the bottom surface thereof, which recesses are separated by partitions integrally formed with said upper body portion.

20. The catcher of claim 19 in which said recesses are positioned in a row extending substantially parallel to said drop catching surface.

21. The catcher of claim 20 in which said lower plate portion comprises a porous lower plate mounted on the lower surface of said upper body portion.

22. The catcher of claim 21 in which the lower portions of said partitions define downward extending lands which contact said porous lower plate.

23. The catcher of claim 22 in which said porous lower plate is adhesively bonded to said lands, whereby the height of said slot is precisely defined.

24. The catcher of claim 18 in which said drop catching surface curves inward into said drop ingesting slot, and in which said drop catching surface has a radius of curvature of approximately $\frac{1}{8}$ inch adjacent said slot.

* * * * *

UNITED STATES PATENT AND TRADEMARK OFFICE
CERTIFICATE OF CORRECTION

PATENT NO. : 4,268,836

DATED : May 19, 1981

INVENTOR(S) : David A. Huliba and Lonnie P. Robinson

It is certified that error appears in the above—identified patent and that said Letters Patent is hereby corrected as shown below:

Claim 1, line 2, "printing" should be --print--.

Claim 1, line 19, "selectiely" should be --selectively--.

Signed and Sealed this

*Eighth* Day of *September 1981*

[SEAL]

*Attest:*

GERALD J. MOSSINGHOFF

*Attesting Officer* *Commissioner of Patents and Trademarks*